US011053013B2

(12) United States Patent
Vaillant et al.

(10) Patent No.: US 11,053,013 B2
(45) Date of Patent: Jul. 6, 2021

(54) UNIT FOR GENERATING NON-PROPULSIVE ELECTRICAL POWER

(71) Applicants: SAFRAN POWER UNITS, Toulouse (FR); INSTITUT NATIONAL POLYTECHNIQUE DE TOULOUSE, Toulouse (FR); CENTRE NATIONAL DE LA RECHERCHE SCIENTIFIQUE, Paris (FR)

(72) Inventors: Stephane Richard Dominique Vaillant, Fonbeauzard (FR); Mickael Faucher, Grenade (FR); Christophe Turpin, Toulouse (FR)

(73) Assignees: SAFRAN POWER UNITS, Toulouse (FR); INSTITUT NATIONAL POLYTECHNIQUE DE TOULOUSE, Toulouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 453 days.

(21) Appl. No.: 15/843,573

(22) Filed: Dec. 15, 2017

(65) Prior Publication Data
US 2018/0170564 A1    Jun. 21, 2018

(30) Foreign Application Priority Data
Dec. 15, 2016    (FR) .................................... 16 62480

(51) Int. Cl.
*B64D 27/24*    (2006.01)
*F01D 15/10*    (2006.01)
(Continued)

(52) U.S. Cl.
CPC .............. *B64D 27/24* (2013.01); *B64C 27/22* (2013.01); *B64D 13/06* (2013.01); *F01D 15/10* (2013.01);
(Continued)

(58) Field of Classification Search
CPC ......... B64D 27/24; B64D 13/06; F01D 15/10; F02C 6/14; F02C 7/08; F02C 7/32; F02C 3/00; F02C 3/04; B64C 27/22
(Continued)

(56) References Cited

U.S. PATENT DOCUMENTS

| 6,031,294 A * | 2/2000 | Geis .......................... F02C 9/56 |
| | | 290/40 R |
| 8,957,539 B1 * | 2/2015 | Ralston ................... F01D 15/10 |
| | | 290/52 |

(Continued)

FOREIGN PATENT DOCUMENTS

WO    WO-2015133994 A1 *   9/2015       F01D 21/14

OTHER PUBLICATIONS

French Preliminary Search Report dated Aug. 18, 2017 in French Application 16 62480 filed on Dec. 15, 2016 (with English Translation of Categories of Cited Documents).

*Primary Examiner* — Viet P Nguyen
(74) *Attorney, Agent, or Firm* — Oblon, McClelland, Maier & Neustadt, L.L.P.

(57) ABSTRACT

A unit (1', 10', 100') for generating non-propulsive electrical power for use on board an aircraft, the unit (1', 10', 100') comprising an electricity production device (3, 30) comprising a gas turbine (31) and an electricity generator (32) mechanically connected to an outlet shaft (33) of the gas turbine (31), said electricity generator (32) including output electrical connections (320) for being electrically connected to an electrical power supply network (2, 20, 200) on board an aircraft.

The unit (1', 10', 100') includes energy storage means (5) and regulator means (6) configured to control the speed of
(Continued)

rotation of the gas turbine (31) as a function of the electrical power required by the on-board electrical power supply network (2, 20, 200).

5 Claims, 4 Drawing Sheets (51) Int. Cl.
| | |
|---|---|
| F02C 3/00 | (2006.01) |
| F02C 3/04 | (2006.01) |
| B64C 27/22 | (2006.01) |
| B64D 13/06 | (2006.01) |
| F02C 7/08 | (2006.01) |
| F02C 7/32 | (2006.01) |
| B64D 27/02 | (2006.01) |
| B64D 41/00 | (2006.01) |

(52) U.S. Cl.
CPC ............... *F02C 3/00* (2013.01); *F02C 3/04* (2013.01); *F02C 7/08* (2013.01); *F02C 7/32* (2013.01); *B64D 2027/026* (2013.01); *B64D 2041/002* (2013.01); *F05D 2220/50* (2013.01); *F05D 2220/76* (2013.01); *F05D 2270/03* (2013.01)

(58) Field of Classification Search
USPC .......................................................... 290/52
See application file for complete search history.

(56) References Cited

U.S. PATENT DOCUMENTS

| | | | |
|---|---|---|---|
| 2002/0175522 A1* | 11/2002 | Wacknov ................. | H02P 9/04 |
| | | | 290/52 |
| 2004/0245783 A1* | 12/2004 | Gilbreth ................... | H02J 1/10 |
| | | | 290/52 |
| 2005/0072164 A1* | 4/2005 | MacKay ................. | F01D 15/10 |
| | | | 60/805 |
| 2006/0220387 A1* | 10/2006 | Tsuzuki ................... | H02P 9/04 |
| | | | 290/52 |
| 2010/0219779 A1* | 9/2010 | Bradbrook ............. | F02C 3/113 |
| | | | 318/153 |
| 2012/0025032 A1* | 2/2012 | Hopdjanian .......... | B60L 3/0046 |
| | | | 244/53 R |
| 2012/0153076 A1* | 6/2012 | Burns ...................... | F02C 7/32 |
| | | | 244/58 |
| 2013/0147204 A1* | 6/2013 | Botti ....................... | F02B 63/04 |
| | | | 290/1 A |
| 2017/0190441 A1* | 7/2017 | Mackin .................. | F01D 25/36 |
| 2018/0058336 A1* | 3/2018 | Munevar ................. | F02C 7/36 |
| 2018/0252161 A1* | 9/2018 | Munevar ............... | F41H 13/005 |

* cited by examiner

UNIT FOR GENERATING NON-PROPULSIVE ELECTRICAL POWER

BACKGROUND OF THE INVENTION

The invention relates to a unit for generating non-propulsive electrical power on board an aircraft.

Auxiliary power units (APUs) serve to deliver non-propulsive power on board an aircraft. Most of those units are constituted by linked-turbine gas turbines or by single-spool gas turbines that deliver both a stream of compressed air referred to as "bleed" air, and also electricity via a generator mounted on a reduction gearbox driven by the shaft of the machine. Single-spool turbines should be understood in contrast two two-spool machines in which the first spool that produces power in the form of hot gas is not mechanically linked to the second spool that transforms the power produced by the first spool into useful power for the aircraft.

As a general rule, those units operate at a constant speed of rotation in order to be able to feed the electricity network with electricity at a constant frequency. That frequency is determined by the speed of rotation of the gas turbine, by the number of electrical poles of the generator, and by the reduction ratio of the gearbox.

In certain particular situations, the auxiliary power unit is used to supply electrical power only, without any bleed air stream. This applies in particular when such units are installed in "all-electric" aircraft in which electricity is the sole energy vector. With such architectures, the compressed bleed air stream is not supplied by the auxiliary power unit, but rather by electric compressors associated with an electrical environmental control system (ECS). The auxiliary power units of so-called "all-electric" aircraft are thus spared generating the compressed bleed air stream and are dedicated solely to generating non-propulsive electrical power.

The auxiliary power unit is generally optimized to deliver its maximum power with the lowest specific consumption, where specific consumption corresponds to the ratio of fuel consumption per unit power produced. As a result, when the auxiliary power unit needs to deliver power at an intermediate level, i.e. a level below maximum power, then the auxiliary unit consumes more fuel than it ought compared with the power it produce, since its speed of rotation is set to be a single speed of rotation.

OBJECT AND SUMMARY OF THE INVENTION

The invention seeks to provide an auxiliary power unit enabling the consumption of its gas turbine to be limited as much as possible regardless of the level of power required by the network, thereby improving the overall efficiency with which electrical power is produced.

The invention proposes a unit for generating non-propulsive electrical power for use on board an aircraft, the unit comprising an electricity production device comprising a gas turbine and an electricity generator mechanically connected to an outlet shaft of the gas turbine, said generator including output electrical connections for being electrically connected to an electrical power supply network on board an aircraft.

According to a general characteristic of the invention, the unit comprises regulator means configured to control the speed of rotation of the gas turbine as a function of the electrical power required by the on-board electrical power supply network, and energy storage means.

Regulating the speed of rotation of the gas turbine at a variable speed makes it possible to limit the consumption of the gas turbine as much as possible, thereby optimizing consumption when the need for power is less than the maximum power that the gas turbine can develop.

Specifically, by reducing the speed of rotation of the turbine of the auxiliary power unit, it is possible to improve its consumption at intermediate powers. For example, its consumption drops by about 20% with a speed reduction to 80% of the nominal speed for a load equal to 25% of the maximum load.

For auxiliary power units of "all-electric" aircraft that are dedicated to producing electrical power only, it is possible to achieve fuel savings at intermediate powers by means of variable speed regulation.

Nevertheless, varying the speed of rotation of the gas turbine leads to difficulties.

In particular, during large load peaks, i.e. during large and sudden demands for electricity by the on-board electrical power supply network, or during a transition between two speeds of rotation of the turbine, it is probable that the turbine is not capable of accelerating from an intermediate speed to the nominal speed without exceeding the surge margin of the compressor and/or without exceeding the maximum acceptable temperature limit at the inlet of the turbine and/or without extinguishing the combustion chamber.

The use of electricity storage means in the unit enables power transients between two speeds of rotation of the turbine to be covered and enables the gas turbine to be protected from accelerations that are too sudden as a result of sudden rises in demand for electricity, which sudden accelerations could lead to surging of the gas turbine and/or to an excessive increase in temperature at the inlet of the turbine.

The storage means enable this difficulty to be overcome.

In a first aspect of the unit for producing non-propulsive electrical power, the unit may further comprise power management means comprising a first module configured, in a first mode, to cause at least part of the power produced by the electricity production device to be recovered and stored in said storage means, and a second module configured, in a second mode, to cause the on-board electricity power supply network to be powered by means of electricity produced both from the gas turbine and from the storage means, the power management means being configured to actuate the first module when the speed of rotation of the gas turbine is at a maximum and the level of charge in the storage means is below a charge threshold, and to actuate the second module on detecting variation in the electricity required by the on-board network.

The unit is thus capable of recharging the storage means during nominal operation while the speed of rotation of the gas turbine is not varying. The value of the charge threshold depends on the technical characteristics of the storage means and in particular on the lifetime that is desired for the storage means.

Specifically, as a general rule, for battery type storage means, lifetime is reduced increasingly with increasing depths of discharge. By way of example, the charge threshold may be set at a value lying in the range 50% to 70% of the total charge capacity of the storage means.

In the first mode of operation, the unit is capable of supplying power to the load, i.e. to the network, while enabling the gas turbine to vary its operating point but without running the risk of entering into a mode of operation that is damaging for the gas turbine and while enabling the storage means to be charged.

The second mode of operation enables the unit to be operated in a second mode in which the energy stored in said storage means is used to supply additional energy to the electricity power supply network on board the aircraft. This second mode serves to reduce the acceleration of the turbine during a transition between two speeds of rotation of the turbine by supplying mechanical or electrical energy from the energy stored in the storage means, thereby allowing the turbine to accelerate to the higher speed over a longer length of time, i.e. with smaller acceleration. The second mode also serves to protect the gas turbine from accelerations that are too sudden due to sudden rises in demand for electricity, the extra electricity required by the network being handled by energy supplied from the storage means.

In a variant of the first aspect of the unit for producing non-propulsive electrical power, the regulator means may be configured to cause an increase in the speed of rotation of the gas turbine to a speed higher than that required for generating the electrical power required by the electrical power supply network, the power management means actuating the first module so as to recover the excess power for recharging the storage means.

The regulator means can thus cause the electricity production device to accelerate to a level greater than that required by the network in order to bring the level of charge in the storage means to the value needed to ensure that the second mode of powering the power supply network is operational.

In a second aspect of the unit for producing non-propulsive electrical power, the electricity production device may include first power converter means, said output electrical connections of the electricity generator being for connecting electrically to the on-board electricity power supply network via the first power converter means.

The first power converter means coupled between the output of the electricity generator and the network serve to adapt the electricity delivered to the network from the electricity delivered by the electricity production device.

In a third aspect of the unit for producing non-propulsive electrical power, the unit may further comprise second power converter means connected between the storage means and the electricity production device.

The storage means alone cannot supply electrical power compatible with the constraints of the electricity network of an airplane. The use of power converter means makes it possible firstly to convert the electrochemical energy stored in the storage means into electrical or mechanical energy suitable for assisting the electricity production device to respond to sudden rises in electricity demand from the network, and secondly to convert a portion of the power supplied by the electricity production device in order to store it and thus recharge the storage means.

In a fourth aspect of the unit for producing non-propulsive electrical power, the second power converter means may comprise a mechanical transmission gearbox coupled to the outlet shaft of the gas turbine and including a mechanical coupling shaft.

In a first embodiment of the fourth aspect of the unit for producing non-propulsive electrical power, the storage means may comprise a flywheel mechanically connected to the mechanical coupling shaft of the mechanical transmission gearbox.

In a second embodiment of the fourth aspect of the unit for producing non-propulsive electrical power, the storage means may comprise a battery, and the second power converter means may comprise an electrical machine mechanically coupled to the transmission gearbox via the mechanical coupling shaft and electrically coupled to electrical terminals of said storage means.

In a third embodiment of the fourth aspect of the unit for producing non-propulsive electrical power, the second converter means may further comprise a power converter, the electrical terminals of the storage means being electrically connected to said electrical machine via the power converter.

The power converter may be of the DC-DC or DC-AC or AC-DC or indeed AC-AC type.

The use of a power converter makes it possible to adapt the electricity coming from the storage means so that the additional mechanical power conveyed by the transmission gearbox to the outlet shaft enables the outlet shaft to rotate at a speed of rotation enabling the electricity generator to continue delivering AC at constant frequency.

When the storage means comprise a battery of electrochemical accumulators, a DC-DC or DC-AC converter is used depending on the type of electrical machine used in the power converter means.

In contrast, when the storage means comprise a flywheel, for example, an AC-DC or AC-AC converter is used as a function of the type of electrical machine used in the power converter means.

In a fifth aspect of the unit for producing non-propulsive electrical power, the storage means may comprise a battery, and the second power converter means may comprise a power converter having a first electrical coupling and a second electrical coupling, the first electrical coupling being connected to the electrical output connections of the electricity generator and the second electrical coupling of the power converter being connected to the electrical terminals of the storage means.

In a variant of the fifth aspect of the unit for producing non-propulsive electrical power, the storage means comprise a battery, and the power converter means may comprise a power converter having a first electrical coupling connected to the second electrical coupling of the power converter of the first converter means, and a second electrical coupling connected to the electrical terminals of the storage means.

In a sixth aspect of the unit for producing non-propulsive electrical power, the unit may further comprise an output AC-DC power converter having a first electrical coupling and a second electrical coupling, the storage means comprising a battery having first electrical terminals and second electrical terminals, said first electrical terminals of the storage means being coupled to the output of the electricity production device and said second electrical terminals of the storage means being coupled to said first electrical coupling of the output AC-DC power converter, the second electrical coupling of the output AC-DC power converter being for connection to the on-board electrical power supply network.

The invention also provides an aircraft including a unit for generating non-propulsive electrical power as defined above and coupled to an on-board electrical power supply network.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
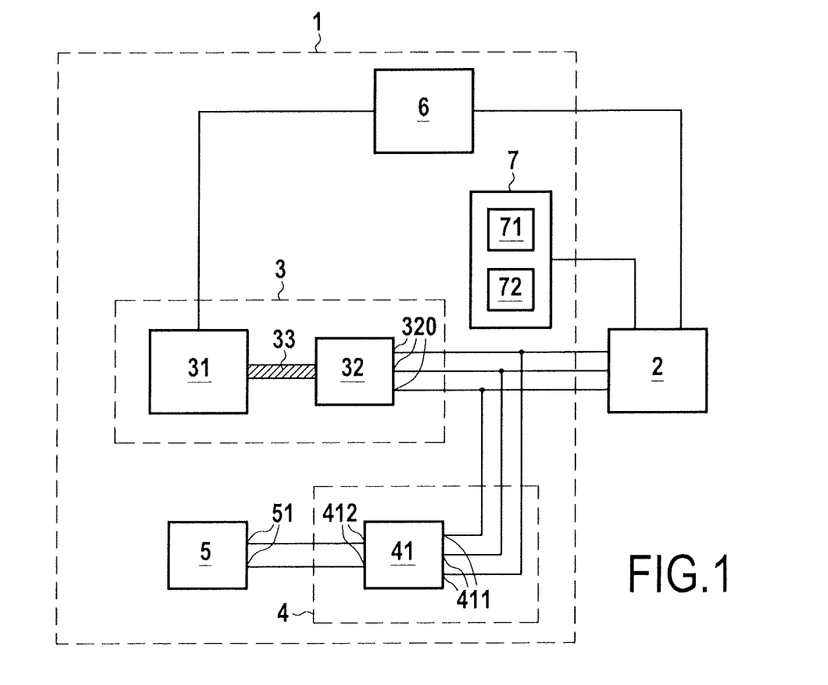
FIG. 1 is a diagram of a unit for generating non-propulsive electrical power on board an aircraft in a first embodiment.

FIG. 1 is a diagram of a unit 1 for generating non-propulsive electrical power on board an aircraft in a first embodiment.

In the first embodiment shown in FIG. 1, the unit 1 is connected to an electricity power supply network 2 on board an aircraft that operates with alternating current (AC) at variable frequency.

The unit 1 comprises an electricity production device 3 comprising a gas turbine 31 and an electricity generator 32. The electricity generator 32 is mechanically connected to the gas turbine 31 via an outlet shaft 33 of the gas turbine 31. The electricity generator 32 is coupled to the outlet shaft 33 via a reduction gearbox (not shown). The electricity generator 32 has three electrical connections 320 each connected to a respective phase of the on-board electrical power supply network 2 in order to supply AC directly to the network 2, with the frequency of the AC delivered by the electricity generator 32 being capable of varying as a function of the load on the network 2.

In a variant, the electricity generator 32 may be coupled directly to the outlet shaft 33 without a gearbox, in particular when electricity generators are used that are capable of operating at the speed of the gas turbine.

The unit 1 also has power converter means 4 and a storage battery 5 having terminals 51. In the first embodiment, the power converter means 4 comprise an AC-DC power converter 41 having three first terminals 411 connected to the three electrical connections 320 of the electricity generator 32, and two second terminals 412 connected to the two terminals 51 of the battery 5.

The unit 1 also has regulator means 6 that control the gas turbine 31. The regulator means 6 are configured to regulate the speed of rotation of the gas turbine 31 as a function of the electrical power required by the network 2.

The unit 1 also has power management means 7 comprising a first module 71 configured, in a first mode, to cause at least a portion of the power produced by the electricity production device 3 to be recovered and stored in the battery 5 via the AC-DC power converter 41, and a second module 72 configured, in a second mode, to cause the on-board electricity power supply network 2 to be powered with electricity produced both from the gas turbine 31 and from the battery 5, the power management means 7 being configured to actuate the first module 71 when the speed of rotation of the gas turbine 31 is at a maximum and the level of charge in the battery is less than a charge threshold, e.g. 30% of the maximum charge of the battery 5, and to actuate the second module 72 when detecting variation in the electricity required by the on-board network 2. The power management means 7 may decide to accelerate the electricity production device 3 to a level greater than that required by the network 2 in order to bring the level of charge to the value needed for the second mode of powering the electricity network 2 to be functional.

Figure 2:
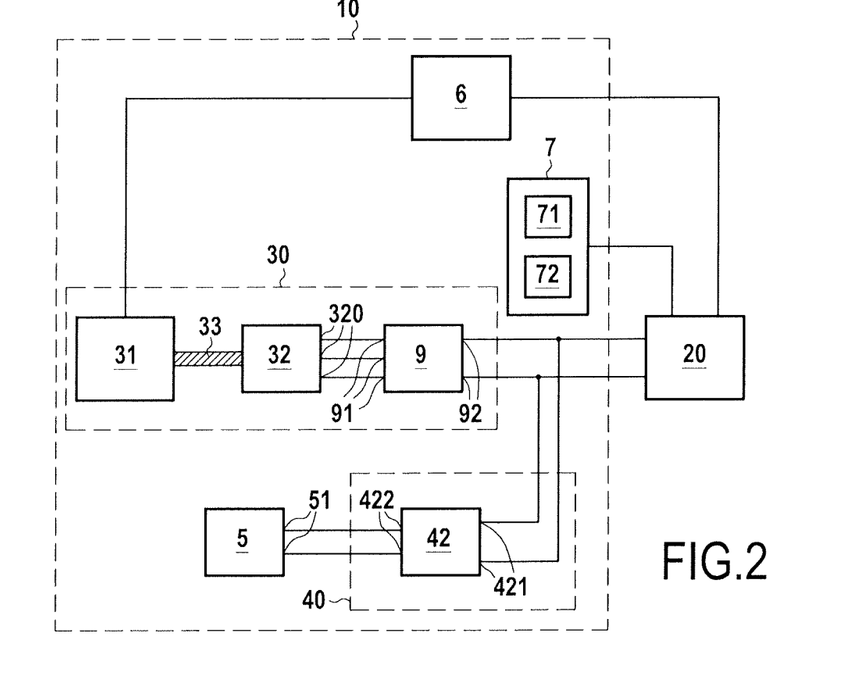
FIG. 2 is a diagram of a unit for generating non-propulsive electrical power on board an aircraft in a second embodiment.

FIG. 2 is a diagram of a unit 10 for generating non-propulsive electrical power on board an aircraft in a second embodiment.

Elements identical to the first embodiment are given the same numerical references.

In the second embodiment, the electricity power supply network 20 on board the aircraft is a direct current (DC) network.

In order to power the DC network 20 of the aircraft, the unit 10 of the second embodiment differs from the unit 1 of the first embodiment in that the electricity production device 30 also includes an AC-DC power converter 9 having first terminals 91 that are electrically connected to the three electrical connections 320 of the electricity generator 32, and two second terminals 92 each coupled to a respective one of the two lines of the network 20.

The generator 32 is thus not electrically connected directly to the network 20.

The power converter means 40 of the unit 10 in the second embodiment further comprise a DC-DC power converter 42 having two first terminals 421 electrically connected to the two second terminals 92 of the AC-DC power converter 9 of the electricity production device 30, and two second terminals 422 electrically connected to the two terminals 51 of the battery 5. The AC-DC power converter 42 is configured to modulate the direct current between the battery 5 and the network 20.

In possible variants of the first and second embodiments, not only does the electricity converter that is optionally provided in the electricity production device 3 enable the electricity delivered by the electricity production device to be adapted, but also the unit 1 or 10 can further comprise additional power converter means connected between the output terminals of the electricity production device 3 or 30, i.e. the electrical connections 320 of the electricity generator 32 or the second terminals 92 of the power converter 9, and the lines of the power supply network 2 or 20. These additional power converter means thus serves to adapt the electricity delivered to the network from the electricity delivered by the electricity production device. The characteristics of the electricity produced by the electricity generator can thus be maintained at the same values by using additional power converter means between the electricity production device and the network.

Thus, the additional power converter means may be an AC-AC, an AC-DC, a DC-AC, or a DC-DC power converter.

In addition, depending on the variant, the electricity generator of the electricity production device 3 or 30 may be a DC generator or an AC generator.

Thus, depending on the type of electricity generator, the power converter of the electricity production device may be a power converter that is AC-AC, AC-DC as in the second embodiment, DC-AC, or DC-DC.

Figure 3:
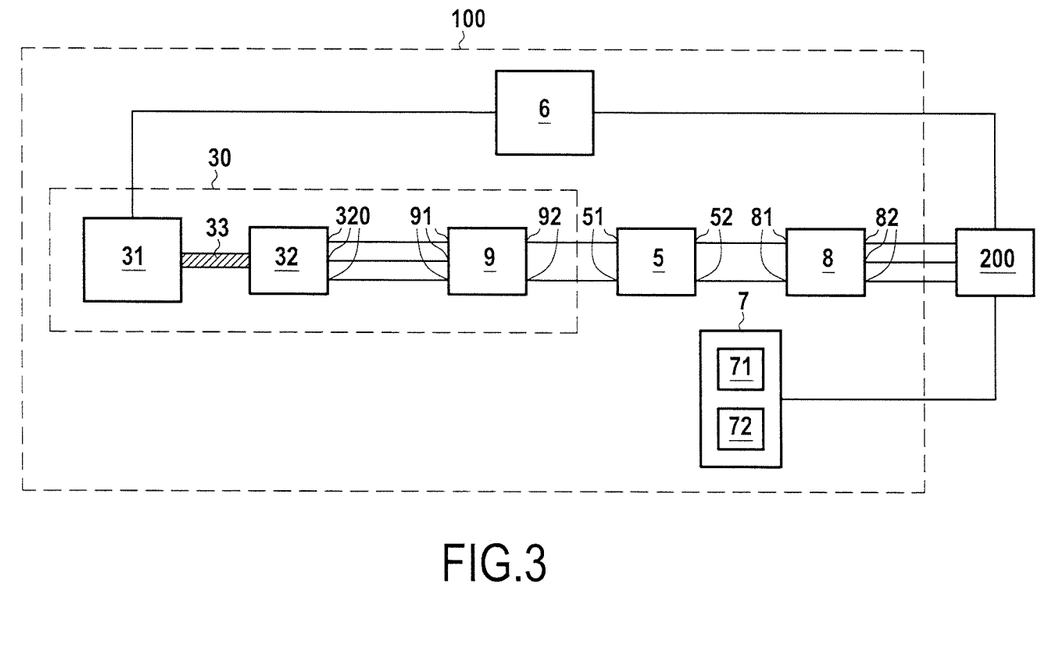
FIG. 3 is a diagram of a unit for generating non-propulsive electrical power on board an aircraft in a third embodiment.

FIG. 3 is a diagram of a unit 100 for generating non-propulsive electrical power on board an aircraft in a third embodiment.

Elements that are identical to the first embodiment are given the same numerical references.

In the third embodiment, the electricity power supply network 200 on board the aircraft is an AC network at constant frequency.

To power the constant frequency AC network 200 of the aircraft, the unit 100 of the third embodiment differs from the unit 1 of the first embodiment in that the battery 5 has two first terminals 51 and two second terminals 52, and, as in the second embodiment, the electricity production device 30 includes an AC-DC power converter 9 having first terminals 91 that are electrically connected to the three electrical connections 320 of the electricity generator 32 and two second terminals 92 of the AC-DC power converter 9 that are coupled to the terminals 51 of the battery 5.

The generator 32 is thus not electrically connected directly to the network 200.

In addition, in the third embodiment, the unit 100 has an output AC-DC power converter 8 having two first terminals 81 coupled to the two second terminals 52 of the battery 5 and three second terminals 82 electrically connected to respective ones of the three phases of the three-phase network 200. The output AC-DC power converter 8 is configured to deliver AC at the constant frequency of the network 200 from the DC delivered by the battery 5.

The two second terminals 52 of the battery 5 may be the same as the two first terminals 51 of the battery 5.

Figure 4:
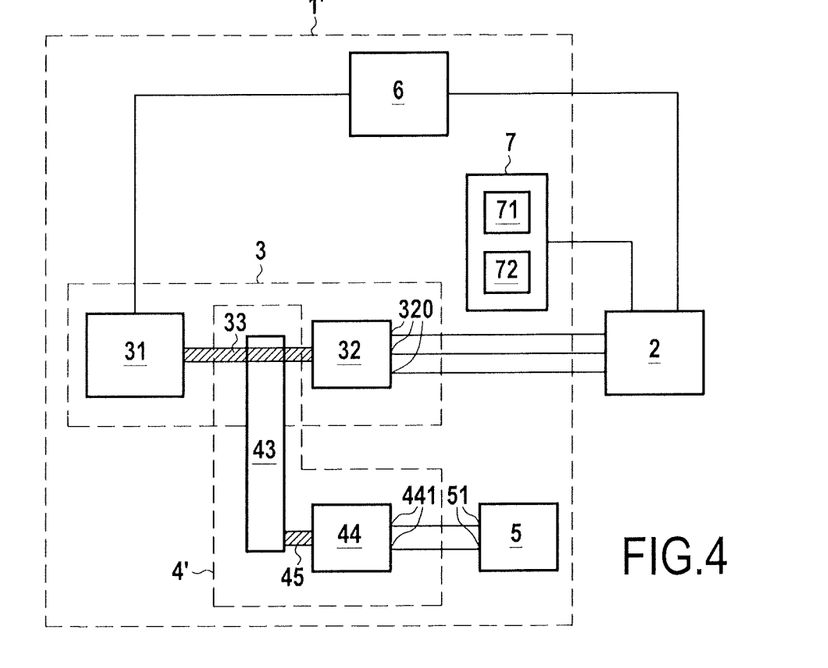
FIG. 4 is a diagram of a unit for generating non-propulsive electrical power on board an aircraft in a fourth embodiment.

FIG. 4 is a diagram showing a unit 1' for generating non-propulsive electrical power on board an aircraft in a fourth embodiment.

Elements that are identical to the first embodiment are given the same numerical references.

In the fourth embodiment, the electricity power supply network 2 on board the aircraft is a variable frequency AC network.

In order to power the variable frequency AC network 2 of the aircraft, the three electrical connections 320 of the electricity generator 32 of the unit 1' of the fourth embodiment are each connected directly to a respective one of the three phases of the network 2, as for the unit 1 of the first embodiment.

The unit 1' of the fourth embodiment differs from the unit 1 of the first embodiment in that the AC-DC power converter 41, and thus the power converter means 4, is replaced by the association of a mechanical power transmission gearbox 43 that is mechanically coupled to the outlet shaft 33 of the gas turbine 31, and an electrical machine 44 that is mechanically coupled to the transmission gearbox 43 via a shaft 45. The unit 1' also has power converter means 4' comprising a transmission gearbox 43 and an electrical machine 44, the electrical machine 44 having two electrical terminals 441 that are electrically connected to the terminals 51 of the battery 5.

The power management means 7 are configured to control the electrical machine 44 so that it delivers electricity to the battery 5 or else takes electricity from the battery 5 in order to deliver additional mechanical power to the outlet shaft 33 of the turbine 31 via the transmission gearbox 43, thereby assisting the gas turbine 31 to accelerate without leading to overheating or other problems.

Figure 5:
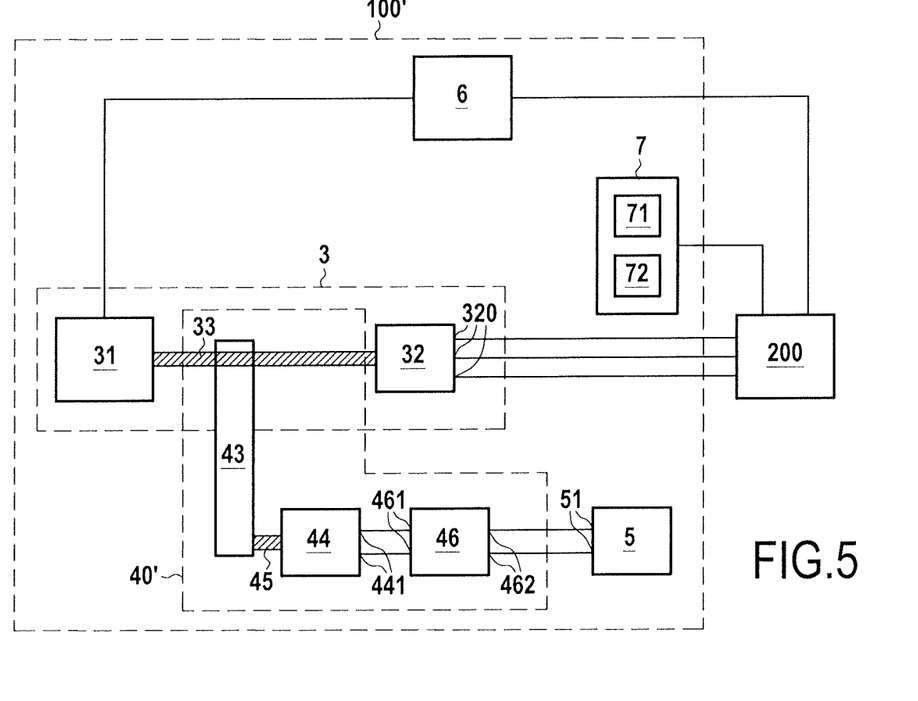
FIG. 5 is a diagram of a unit for generating non-propulsive electrical power on board an aircraft in a fifth embodiment.

FIG. 5 is a diagram of a unit 100' for generating non-propulsive electrical power on board an aircraft in a fifth converter.

Elements identical to the fourth embodiment are given the same numerical references.

In the fifth embodiment, the electrical power supply network 200 on board the aircraft is a constant frequency AC network.

In order to power the constant frequency AC network 200 of the aircraft, the unit 100' of the fifth embodiment differs from the unit 1' of the fourth embodiment in that the power converter means 40' further comprises a DC-DC power converter 46 having two first terminals 461 electrically coupled to the two electrical terminals 441 of the electrical machine 44 and two second terminals 462 electrically coupled to the two terminals 51 of the battery.

The DC-DC power converter 46 is configured to modulate the electricity delivered by the battery 5 at a frequency corresponding to the constant frequency of operation of the network 200.

Figure 6:
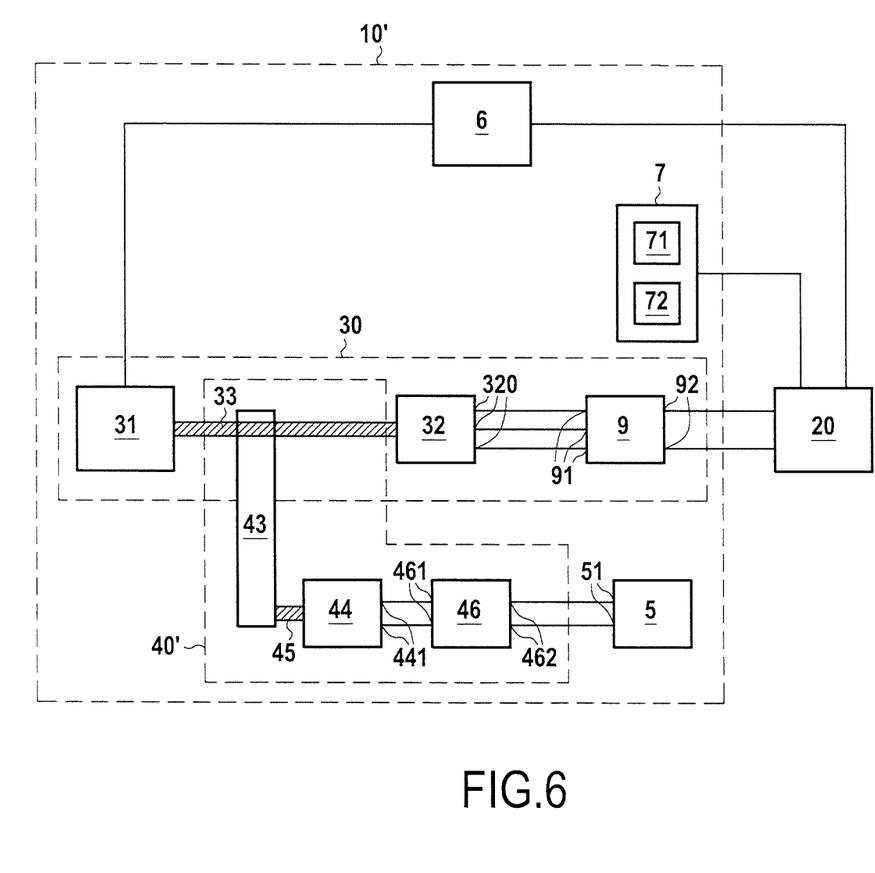
FIG. 6 is a diagram of a unit for generating non-propulsive electrical power on board an aircraft in a sixth embodiment.

FIG. 6 is a diagram of a unit 10' for generating non-propulsive electrical power on board an aircraft in a sixth embodiment.

Elements that are identical to the fifth embodiment are given the same numerical references.

In the sixth embodiment, the electrical power supply network 20 on board the aircraft is a DC-DC network.

In order to power the DC network 20 of the aircraft, the unit 10' of the sixth embodiment differs from the unit 100' of the fifth embodiment in that the electricity production device 30 of the unit 100' further comprises an AC-DC power converter 9 having three first terminals 91 electrically coupled to the three electrical connections 320 of the electricity generator 32 and two second terminals 92, each electrically connected to one of the two lines of the DC network 20.

In a variant of this sixth embodiment, the unit could include an electricity production device 3 that has only the gas turbine 31 and the electricity generator 32, the unit further including additional power converter means comprising an AC-DC power converter connected between the electricity generator 32 and the DC network 20.

The invention thus makes it possible with various different architectures to provide an auxiliary power unit enabling the consumption of its gas turbine to be limited as much as possible, thereby improving the efficiency with which electricity is produced.

The invention claimed is:

1. A unit for generating non-propulsive electrical power for use on board an aircraft, the unit comprising:
    an electricity production device including a gas turbine, and an electricity generator mechanically connected to an outlet shaft of the gas turbine, said electricity generator including output electrical connections to be electrically connected to an electrical power supply network on board the aircraft;
    energy storage means comprising a battery;
    regulator means configured to control the speed of rotation of the gas turbine as a function of the electrical power required by the on-board electrical power supply network, the regulator means receiving feedback from the on-board electrical power supply network to control the speed of rotation of the gas turbine as the function of the electrical power required by the on-board electrical power supply network;
    second power converter means connected between the energy storage means and the electricity production device, the second power converter means comprising
        a mechanical transmission gearbox coupled to the outlet shaft of the gas turbine and including a mechanical coupling shaft, and
        an electrical machine mechanically coupled to the mechanical transmission gearbox via the mechanical coupling shaft and electrically coupled to electrical terminals of said energy storage means; and
    power management means comprising
        a first module configured, in a first mode, to cause at least part of power produced based on operation of the electricity production device to be recovered and stored in said energy storage means, and a second module configured, in a second mode, to cause the on-board electricity power supply network to be powered by both electricity produced from the gas turbine and energy from the energy storage means when electricity required by the on-board electricity power supply network is greater than a predetermined threshold, wherein the power management means is configured to
actuate the first module when the speed of rotation of the gas turbine is at a maximum and the level of charge in the energy storage means is below a charge threshold so that the electrical machine delivers energy to the energy storage means, and actuate the second module when electricity required by the on-board electricity power supply network is greater than the predetermined threshold by using the enemy stored by the energy storage means to operate the electrical machine to rotate the outlet shaft of the gas turbine via the mechanical transmission gearbox and the mechanical coupling shaft so as to assist acceleration of the gas turbine.

2. The unit according to claim 1, wherein the regulator means are configured to cause an increase in the speed of rotation of the gas turbine to a speed higher than that required for generating the electrical power required by the on-board electrical power supply network, the power management means actuating the first module so as to recover the excess power for recharging the energy storage means.

3. The unit according to claim 1, wherein the electricity production device includes first power converter means, said output electrical connections of the electricity generator being to electrically connect to the on-board electricity power supply network via the first power converter means.

4. The unit according to claim 1, wherein the second power converter means further comprise a power converter, the electrical terminals of the energy storage means being electrically connected to said electrical machine via the power converter.

5. An aircraft including comprising:
a unit for generating non-propulsive electrical power coupled to an on-board electricity power supply network, the unit comprising
an electricity production device comprising a gas turbine and an electricity generator mechanically connected to an outlet shaft of the gas turbine, said electricity generator including output electrical connections for being electrically connected to an electrical power supply network on board the aircraft;
energy storage means comprising a battery;

regulator means configured to control the speed of rotation of the gas turbine as a function of the electrical power required by the on-board electrical power supply network, the regulator means receiving feedback from the on-board electrical power supply network to control the speed of rotation of the gas turbine as the function of the electrical power required by the on-board electrical power supply network;

second power converter means connected between the energy storage means and the electricity production device, the second power converter means comprising
a mechanical transmission gearbox coupled to the outlet shaft of the gas turbine and including a mechanical coupling shaft, and
an electrical machine mechanically coupled to the mechanical transmission gearbox via the mechanical coupling shaft and electrically coupled to electrical terminals of said energy storage means; and power management means comprising
a first module configured, in a first mode, to cause at least part of power produced based on operation of the electricity production device to be recovered and stored in said energy storage means, and
a second module configured, in a second mode, to cause the on-board electricity power supply network to be powered by both electricity produced from the gas turbine and energy from the energy storage means when electricity required by the on-board electricity power supply network is greater than a predetermined threshold, wherein the power management means is configured to
actuate the first module when the speed of rotation of the gas turbine is at a maximum and the level of charge in the energy storage means is below a charge threshold so that the electrical machine delivers energy to the energy storage means, and actuate the second module when electricity required by the on-board electricity power supply network is greater than the predetermined threshold by using the energy stored by the energy storage means to operate the electrical machine to rotate the outlet shaft of the gas turbine via the mechanical transmission gearbox and the mechanical coupling shaft so as to assist acceleration of the gas turbine.

* * * * *